United States Patent
Pulfer et al.

(10) Patent No.: US 8,239,473 B2
(45) Date of Patent: **\*Aug. 7, 2012**

(54) SECURITY CLASSIFICATION OF E-MAIL IN A WEB E-MAIL ACCESS CLIENT

(75) Inventors: Charles E. Pulfer, Ottawa (CA); Brad P. Smith, Merrickville (CA); Connor Warrington, Ottawa (CA)

(73) Assignee: Titus, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,406

(22) Filed: Sep. 19, 2011

(65) Prior Publication Data

US 2012/0023182 A1 Jan. 26, 2012

Related U.S. Application Data (63) Continuation of application No. 11/870,382, filed on Oct. 10, 2007, now Pat. No. 8,024,411.

(60) Provisional application No. 60/829,439, filed on Oct. 13, 2006.

(51) Int. Cl.
*G06F 15/16* (2006.01)
*G06F 15/173* (2006.01)
*G06F 15/177* (2006.01)

(52) U.S. Cl. ............... 709/206; 707/769; 726/23

(58) Field of Classification Search ........... 709/206; 707/769; 726/23

See application file for complete search history.

(56) References Cited

U.S. PATENT DOCUMENTS

| | | | |
|---|---|---|---|
| 5,958,005 A | 9/1999 | Thorne et al. | 709/202 |
| 5,991,709 A | 11/1999 | Schoen | 704/1 |
| 6,591,367 B1 | 7/2003 | Kobata et al. | 713/201 |
| 6,836,846 B1 | 12/2004 | Kanevsky et al. | 713/193 |
| 6,986,049 B2 | 1/2006 | Delany | 713/176 |

(Continued)

FOREIGN PATENT DOCUMENTS

AU 2003202436 3/2003

(Continued)

OTHER PUBLICATIONS

Morrison, Geoff, "Implementation Guide for Email Protective Markings for Australian Government Agencies", Oct. 1, 2005 pp. ii-45, Department of Finance and Administration for Australian Government Information Management Office.

(Continued)

*Primary Examiner* — Haresh N Patel
(74) *Attorney, Agent, or Firm* — Hayes Soloway P.C.

(57) ABSTRACT

Web based e-mail classification is disclosed. A popup dialog adds the ability to classify message such as web e-mail, calendar items and meeting appointments based on specific properties such as security classification, information type, document type, document retention, document caveats, and the like associated with the message. The popup dialog through dropdown selections allows users to select the appropriate classification and properties based upon the content of the message. Administrators can predefine all the classification selections that are available to the user. E-mail classification properties are generated that are associated with the message by metadata insertion and by inserting visual markings that allow users to quickly identify the security, sensitivity, intended distribution or retention of the e-mail or calendar item. By utilizing the classification popup dialog a user can classify an e-mail by one or more classification levels and be ensured that the message is delivered and processed in the appropriate manner.

18 Claims, 7 Drawing Sheets

U.S. PATENT DOCUMENTS

| | | | |
|---|---|---|---|
| 7,020,654 | B1 | 3/2006 | Najmi .............................. 707/100 |
| 7,110,983 | B2 | 9/2006 | Shear et al. ....................... 705/55 |
| 8,024,304 | B2 | 9/2011 | Pulfer et al. ................... 707/694 |
| 8,024,411 | B2 * | 9/2011 | Pulfer et al. ................... 709/206 |
| 2003/0182583 | A1 | 9/2003 | Turco ............................. 713/201 |
| 2003/0236845 | A1 | 12/2003 | Pitsos ............................ 709/206 |
| 2005/0044066 | A1 | 2/2005 | Hooper et al. ..................... 707/3 |
| 2005/0060643 | A1 | 3/2005 | Glass et al. ................. 715/501.1 |
| 2005/0138079 | A1 | 6/2005 | Liu et al. ..................... 707/104.1 |
| 2005/0144245 | A1 | 6/2005 | Lowe .............................. 709/206 |
| 2006/0041605 | A1 | 2/2006 | King et al. ..................... 707/205 |
| 2006/0053490 | A1 | 3/2006 | Herz et al. ........................ 726/23 |
| 2006/0075228 | A1 | 4/2006 | Black et al. ................... 713/167 |
| 2006/0085469 | A1 | 4/2006 | Pfeiffer et al. ................ 707/102 |

FOREIGN PATENT DOCUMENTS

| | | |
|---|---|---|
| WO | WO02/059867 | 8/2002 |

OTHER PUBLICATIONS

"Australian Government Email Metadata Standard (AGEMS), Version 1.0", National Archives of Australia, Dec. 2005. pp. 4-18.

Wyatt, Anthony, "Protective Markings in Email, Email Client Behaviour Specification", Australian Government, Department of Finance and Administration, Nov. 21, 2005, pp. 1-18.

Jones, et al., "Email Protective Marking Standard for the Australian Government", Australian Government, Department of Finance and Administration, Oct. 2005, pp. 1-34.

"Classify for Outlook; Key Features", (http://www.markwilson.ca/outlook.html http://www.markwilson.ca/read-me.html; and http://www.markwilson.ca/oshot.html) May 23, 2005, 8 pgs.

"What is a COM Add-in?" and "Hooking a COM Add-in Up to a Command Bar Control" (http://msdn.microsoft.com/en-us/library/aa190119(office.10,printer).aspx and http://msdn.microsoft.com/en-us/library/aa165301(office.10,printer).aspx, Microsoft Corporation/Visual Basic Programmer's Guide, published or during 2000, 3 pgs, Dec. 31.

"Adobe Streamlines Workflows for Publishers with New Metadata Technology", Adobe Press Room, Sep. 24, 2001, 3 pgs.

"Titus Labs Document Classification V1.1" published Nov. 3, 2005, http://webarchive.org/web/20060104112621/www.titus-labs.com/includes/PDF/DocClassDatasheet.pdf, p. 1.

"Titus Labs Announces Document Classification for Microsoft Word", published Nov. 3, 2005, http://web.archive.org/web/20051126093136/http://www.titus-labs.com/about/Doc-ClassRelease.html, p. 1.

* cited by examiner

SECURITY CLASSIFICATION OF E-MAIL IN A WEB E-MAIL ACCESS CLIENT

CROSS-REFERENCE TO RELATED APPLICATIONS

This application claims priority from U.S. provisional application No. 60/829,439 filed Oct. 13, 2006 and this application is a continuation of U.S. patent application Ser. No. 11/870,382, now U.S Pat. No. 8,024,411, filed Oct. 10, 2007 the contents of which are which is hereby incorporated by reference in their entirety.

TECHNICAL FIELD

The present disclosure relates to computer systems and software, and in particular to electronic mail management and security.

BACKGROUND

Software applications exist to generate many different types of electronic mail (e-mail). Web based e-mail software allows users to access and send e-mail via standard Internet browser sessions. With today's pervasive networking systems such as local area networks (LANs), wide area networks (WANs) and the Internet, and software tools such as e-mail, it is very easy for individuals to send e-mail to different computers, computer systems and other individuals. As a matter of corporate security there is therefore a need to classify, manage and control the creation and flow of e-mail correspondence and the like.

Some web based e-mail systems allow the user to indicate the importance of their e-mail by assigning properties such as "Low Priority", "Urgent" etc. These properties are pre-defined by the e-mail software vendor and the software may not allow the assignment of properties that are really significant to the user, such as security level, the type of information being created or identification of what distribution restrictions should be placed on an e-mail. The properties defined and supported by the software cannot be easily modified by users or administrators and offer limited value in a corporate environments that have higher security and distribution considerations than the normal importance levels. As a result, there is no way to communicate various classifications, project associations, and intended distribution of the e-mail. In addition, current systems do not allow the classification of electronic calendar items and meeting requests.

When classified e-mails are opened by recipients using different e-mail software, other than the one used by the sender, the properties will often not be reflected to the recipient. As a result, the person receiving the e-mail has no easy way to identify the classification or importance of the e-mail or calendar item, and they therefore do not know what limitations should be placed on the handling and distribution of the e-mail. In addition, compliance systems verifying the handling or distribution of the e-mail have no way to decide what to do as there are no meaningful properties attached to the document.

There is therefore a need for an improved classification and management system for web based electronic e-mail.

SUMMARY

In an aspect there is provided a method for message security classification in a web e-mail access client comprising opening a message form within a web client window of the web e-mail access client; receiving a user-generated event from the group consisting of send events, print events and save events; in response to said user-generated event, presenting the user with a popup dialog requiring the user to select a first security classification based upon predefined classification criteria available to the user for associating with the message form of the web e-mail access client; receiving a first security classification selection input from the user; and assigning header properties to the message metadata associated properties based upon the security classification selection.

In accordance with yet another aspect there is provided a non-transitory computer readable medium comprising instructions for message security classification in a web e-mail access client which when executed a processor perform opening a message form within a web client window of the web e-mail access client; receiving a user-generated event from the group consisting of send events, print events and save events; in response to said user-generated event, presenting the user with a popup dialog requiring the user to select a first security classification based upon predefined classification criteria available to the user for associating with the message form of the web e-mail access client; receiving a first security classification selection input from the user; and assigning header properties to the message metadata associated properties based upon the security classification selection.

Other aspects and features will become apparent to those ordinarily skilled in the art upon review of the following description of specific embodiment of the invention in conjunction with the accompanying figures.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-7.

Due to compliance legislation such as the Sarbanes-Oxley Act in the United States (or more precisely, the Public Company Accounting Reform and Investor Protection Act of 2002), policies such as the Health Insurance Portability and Accountability Act (HIPAA), or other legal or corporate guidelines there is a need for greater security of information. Companies need to be able to determine the classification of e-mail so that their employees will handle these e-mails correctly in terms of security, distribution and retention. The best way to do this is to generate recognizable classification properties and visual markers in the e-mails when they are being created so that everyone will know the level of sensitivity of the e-mail and how to handle them. The creation of metadata properties which travel with the e-mail also allows automatic processes to check the handling of the e-mail. For example, a messaging gateway or content scanner can verify the classification of e-mails being sent out of the company for any violations of corporate policy. Heretofore, this could not be done by common corporate e-mail application such as Microsoft™ Outlook™ Web Access (OWA) software. Corporate software such as OWA software cannot force the user to enter any classification properties before an e-mail is sent or saved and provide little no ability to define classifications relative to corporate needs.

Current web based e-mail systems do not modify the e-mail in any way, as a result there are no visual markings in the e-mail message or calendar message that would identify the classification properties. Without visual markings the user has no easy way of identifying the classification, importance, distribution or information type. The web based e-mail classification system disclosed adds the ability to classify e-mail messages, calendar items and meeting appointments messages. The classification can be performed based on content-specific properties such as security classification, information type, document type, document retention, document caveats, and the like. A new toolbar is provided which integrates with web e-mail client such as the OWA environment. This toolbar, through dropdown selections, allows users to select the appropriate classification levels. Administrators can pre-define the classification selections that are available to the user and limit actions available to the user in regards to the content and classification level selected. E-mail properties are generated that are associated with the e-mail or calendar messages through insertion of metadata and by inserting visual markings that allow users to quickly identify the security, sensitivity, intended distribution or retention of the e-mail or calendar item. By utilizing the classification toolbar a user can now classify the message content quickly such as a classification of secret and handle the message appropriately. Message classification automatically creates a property which identifies the message as secret (this is not viewable by the user) and inserts the word "SECRET" marking in visible areas such as the subject line, and in the first and last lines of the message body of the message. This enables the client or server to limit distribution of the e-mail and the respective content and enable the end user to visibly see the classification assigned by the sender without difficultly.

As there is no published application programming interface (API) for Microsoft Outlook Web Access, in order to add classification support to OWA the actual JavaScript code needs to be changed and enhanced. As a result a very good understanding of the original Microsoft OWA code is required. Because the JavaScript code is modified, any time that the web client provider issues a new version or service pack the system needs to be modified resulting in slightly different code for each version. In order to be able to ship only one version of the system an install process is utilized that can recognize the current running version/service pack/fix of client and install the correct code. This was done by calculating a hash of the web client code and verifying on installation.

E-mail administrators can also choose a retention-based model to classify the information to enforce retention with labels such as Personal, Retain for 1 Year, and Corporate Correspondence. After a label is assigned to the e-mail, the e-mail can then be sent as usual. Third party archiving and retention systems can decide if or how to retain a corporate e-mail based on the retention property assigned. After classification labels have been assigned to e-mail, message classification for OWA creates custom properties to reflect the classification. These e-mail properties can be used as search criteria (on a PC or network). For example, using the Microsoft Outlook Search utility, administrators could find all e-mail on the network which have been classified as COMPANY CONFIDENTIAL. Message Classification for OWA can also optionally insert the classification(s) into the e-mail subject line, and the first and/or last line of the message body.

Figure 1:
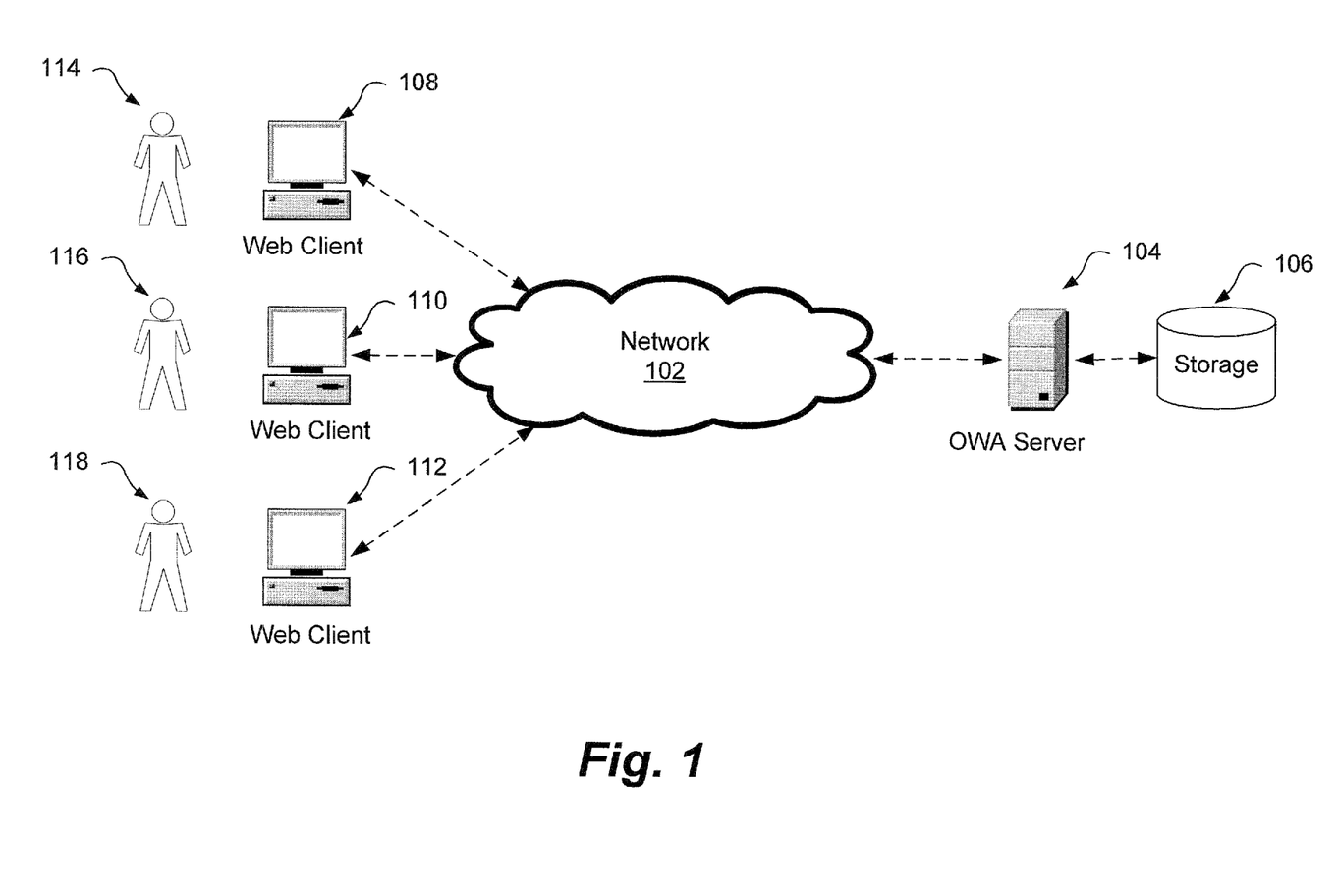
FIG. 1 presents a system diagram of an environment in which web e-mail classification is utilized.

FIG. 1 provides a high level overview environment in which classification toolbars can be utilized. A user selects 114 classifications for a new web e-mail or calendar item message via extensions to the Microsoft Outlook Web Access web mail software executed by computers 108, 110 and 112 having processors and memory for providing web client access. The client may be a personal computer, notebook computer or portable computing device such a mobile phone or personal digital assistant (PDA) device. The web client 108 accesses an e-mail server such as Microsoft OWA Exchange server 104 through a network 102 such as the internet. The server 104 processes client requests and also generates HTML web pages based upon requests from web clients 108, 110 and 112 for viewing e-mail in the client application. When creating a message, the user 114 can select classification properties to be applied to a message. The message is sent with the associated properties appropriately identified through the server 104 with the classification metadata properties flowing as message properties or SMTP x-header properties within the e-mail that the user cannot see. Messages may be stored on a storage device 106 for access by the client. The storage device 106 may also contain computer readable code required to implement the toolbar within the OWA client software on web clients 108, 110 and 112. The recipient 116 receives the message which contains the classification and associated protective markings identified by user 114. Based the classification associated with the message, user 116 may be restricted from downgrading or changing the classification due to appropriate security clearance. The OWA service provides the policy rules for determining how the message can be handled based upon the classification associated with the message.

Event driven logic is utilized to force user to classify an e-mail before send, save or print of an e-mail, or calendar item and will be described in more detail below. All SAVE, PRINT and SEND events are interpreted within the OWA software and ensures that classification selections have been made before these actions. Prevention or warning can be displayed when the user attempts to downgrade a classification on Reply or Forward. In the downgrade prevent mode, if the user tries to downgrade the classification, for example from SECRET to UNCLASSIFIED, they can be prevented from sending the message. Alternatively the e-mail can be automatically classified based on the users profile. For example, all users in the finance department could be configured to automatically apply a classification of FINANCIAL INFO to all their e-mail. Visual markings in the subject line or the first line/last line of the message body can be automatically inserted based upon the selected classification by modifying the HTML content of the message.

Classification selection enables the automatic creation of properties that will travel with the e-mail. Trusted label support provides verification that classification of the e-mail has not been modified (tampered with) in transit since e-mail was sent which can be done by calculating a hash of the message properties on send and recalculating the hash on receipt of the message. In addition, the classification policy allows users to search a network or PC for e-mail with specific classifications using basic Microsoft supplied search tools such as the Microsoft Outlook Search. In addition automatic logging of all classification actions by the user can be provided which can be used to audit user compliance. All classification warnings, classification errors, or all classification events (who classified, when, classification properties assigned, name of document etc) can be logged and reviewed by an administrator.

Context sensitive classification selections which change based on user selection can also be provided by the toolbar. For example, if the user selects CONFIDENTIAL as a classification they can then be prompted to indicate which department generated the confidential information and how long the information should be retained as a corporate record. The logic is the same as that described above, the only difference being that in this case the second level classification is used to indicate the department name rather than the retention period.

Administrator defined settings are captured in the settings.js file which is the central source of configuration information. This enables customization of the list of labels for classification; ability for administrator to configure warnings or prevent users from downgrading classifications on a reply or forward of an e-mail; ability for administrator configuration to apply different customized signatures at the bottom of message depending on the classification selected; administrator can define default labels; define if/when the label(s) will appear in the first or last line of the message; define the formatting and color of any visual marking text in the first and last line of the message; define if/when the label(s) will appear in the message subject line including the ability to display abbreviations of the classifications; force the user to make an explicit selection of a label before saving or sending the e-mail; and sort and search a PC's or network's message database based on the message's classification.

Figure 2:
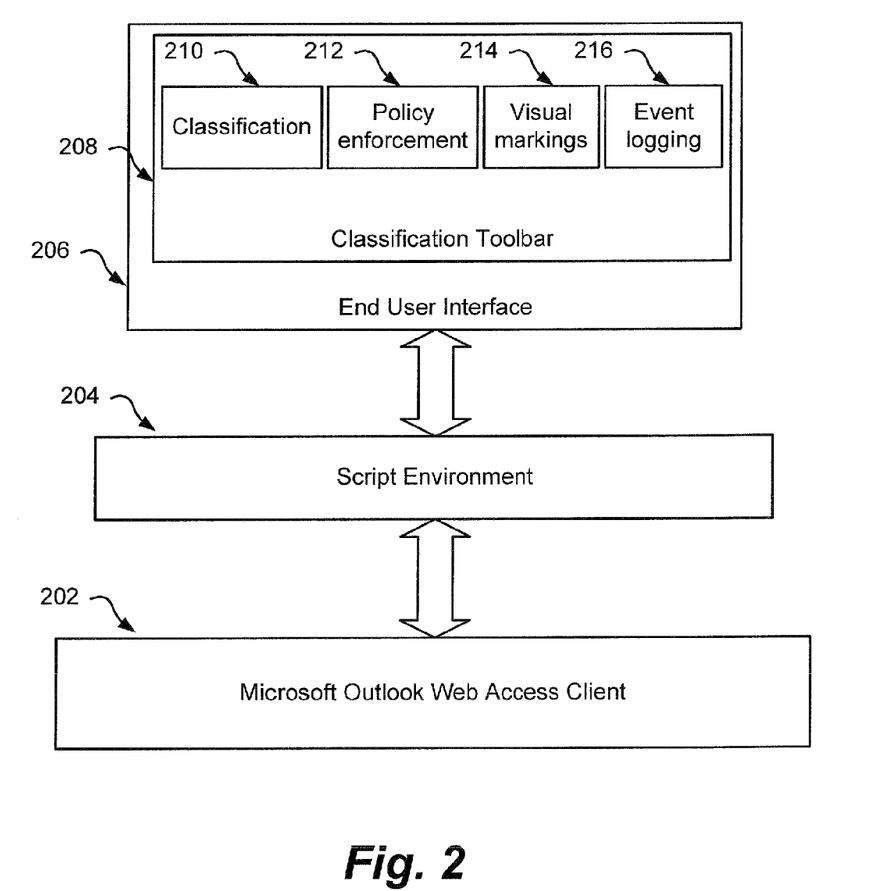
FIG. 2 presents a representation the classification toolbar architecture.

FIG. 2 describes the high level client architecture for implementing web e-mail classification. In this example, the web e-mail software is an OWA client 202 which is implemented in an HTML environment in a web browsers such as Microsoft Internet Explorer™ or similar browser such as Firefox™ or Mozilla™. The development environment in this case is JavaScript™ 204 but may be in other scripted programming languages which are executed by the OWA client 202. The end user interface 206 presents a composition screen (similar to FIG. 3) The web e-mail classification is built by programming in the JavaScript environment to accommodate a classification toolbar 208 presented to the user when composing or replying to an e-mail. The classification toolbar 208 can be composed of several components, some presented to the user while others components provide additional functionality in regards to the classification process itself. For example, classification 210 selections may be presented to the user, as will be described in more detail. Classification policies 212 may be enforced based upon rules relative to the classification associated with the message, for example, certain classifications may limit who the message may be sent to or which messages may be forwarded or replied to. Visual markings 214 may also be included in the e-mail or message upon sending based on the classification, as will be discussed in more detail below, and events related to changes in classification may be logged 216 for access by an administrator.

Figure 3:
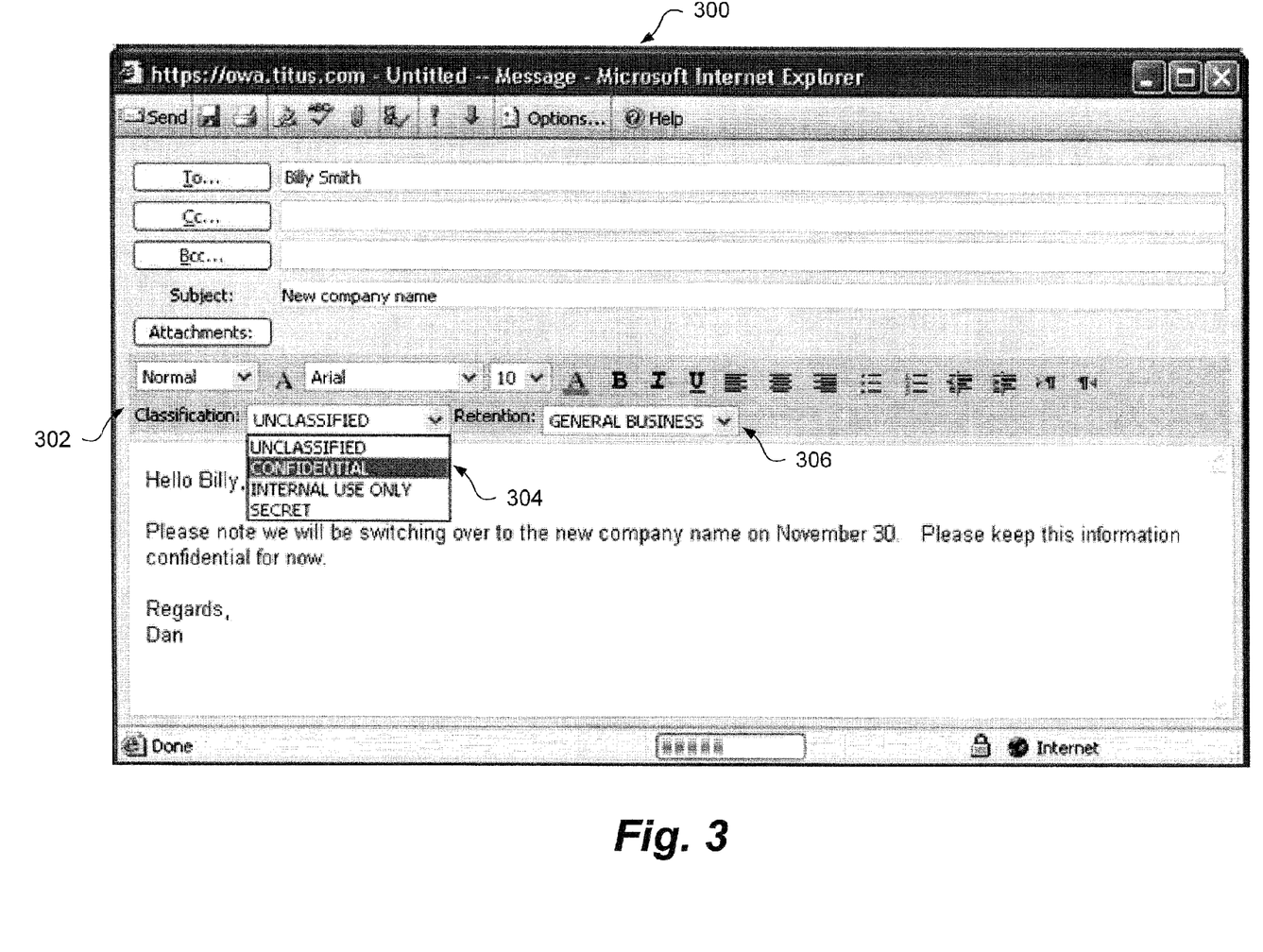
FIG. 3 presents a classification toolbar graphic user interface.

FIG. 3 shows a web page where a classification toolbar is utilized when composing an e-mail message. By using message classification via the OWA toolbar, users can assign a label(s) to classify the e-mail. The browser window 300 presents the user with a composition page which shows standard e-mail options for identifying the recipient(s), a subject line, options to add attachments and a message area. A classification toolbar 302 is added to the web page to enable the user to select classifications to be associated with the e-mail. In this example first level classification entry menu 304 and a secondary classicisation menu defining retention 306 are provided. In the classification menu 304, classifications such as Sensitivity or Security level such as Unclassified, Confidential, Restricted, Internal Use Only, Secret, etc. Other levels of classification can be introduced such as secondary classification 306 to indicate the appropriate department or project name such as HR Information, Accounting Dept, General Business, Purchasing Information, Corporate Finance, or distribution such as Executive Only, Senior Managers only etc. and the like. The collection of classification properties can be context sensitive and the selections are configurable. For example, if the user selects Confidential as the security classification, they could then be prompted for a retention property or a distribution property. On the other hand, if the user selects Unclassified as the message type, there would be no need to collect any other classification properties. As an example, the classification collection logic could be implemented as follows:

```
IF
    First Level Selection is greater than CONFIDENTIAL
THEN
    ALLOW Second Level selection
ELSE
    gray out Second Level Selection
```

This example can be extended to many levels of classification allowing the organizations to collect many classification properties for each e-mail or calendar item. Although an e-mail message is shown a calendar based message such as a meeting request can also utilize the toolbar shown.

Figure 4:
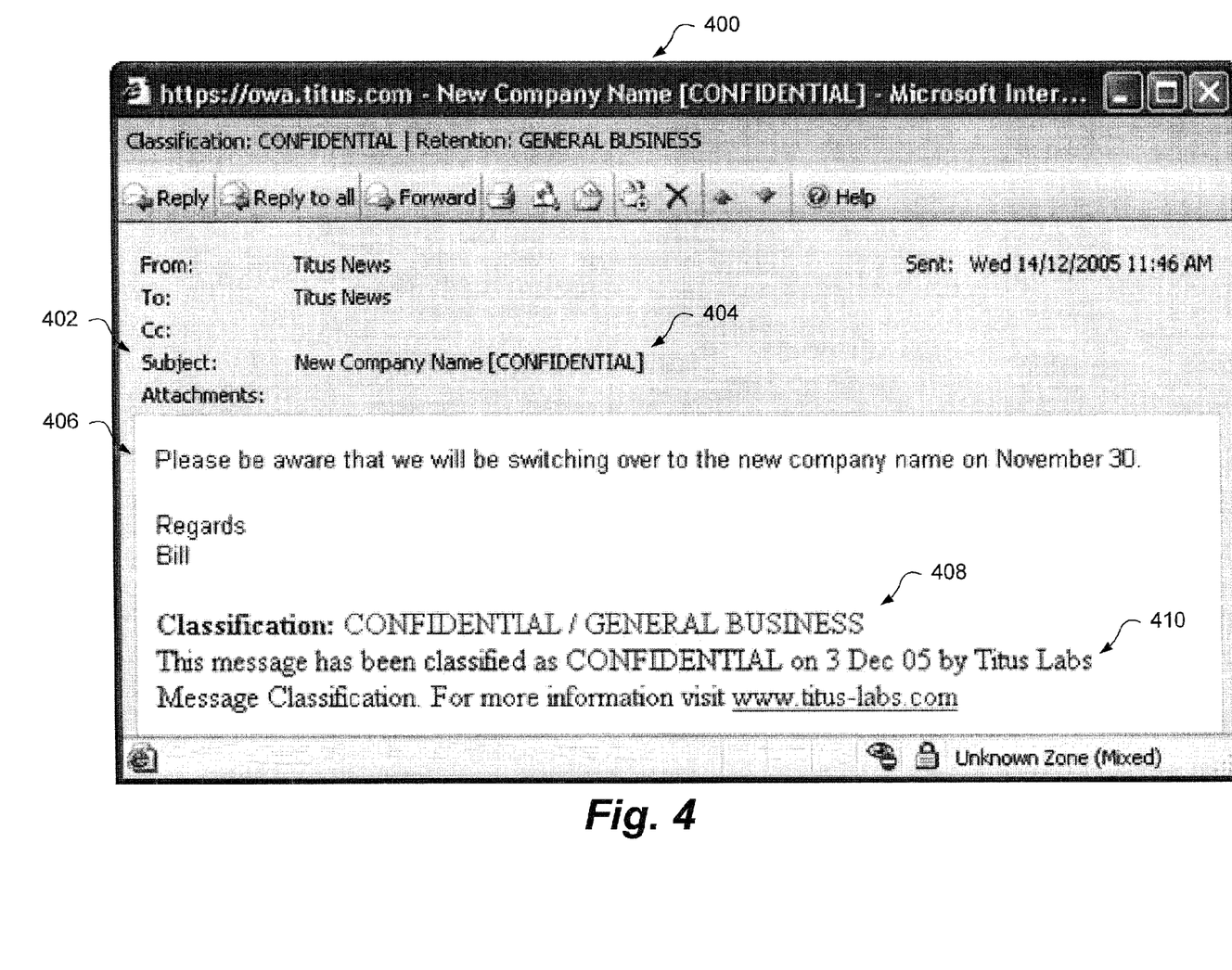
FIG. 4 presents exemplary classifications in an e-mail.

FIG. 4 shows an e-mail message 400 once the classification criteria have been applied to the message, either before sending or when received by the recipient. In the message 400, the subject line 402 can be automatically amended to include a classification identifier 404 based upon the selected classification level. In this example the message was identified as CONFIDENTIAL. This allows the message to be easily evaluated based upon the subject line alone. In addition the classification selection can define a specific prefix or postfix text 408 and 410 that are appended at the top or bottom of the message body. The full classification applied to the message can be displayed at 408, if selected. Context sensitive text such as shown at 410 can be added at the bottom of all outgoing messages. These disclaimers can be intelligently added to be tailored to the classification of the e-mail and the associated content. For example, if UNCLASSIFIED was the selected classification the following text could be appended "This message was sent from XXX Corp. If you are not the intended recipient of the e-mail please notify the sender", whereas a different postfix such as "This message has been marked as Confidential to XXX Corp. Unauthorized reproduction or transmission of the message is prohibited" if the classification selected was CONFIDENTIAL. This is done by modifying the HTML message body of the message. The prefix postfix can be used to automatically display the classifications in the body of the message for awareness. For instance by inserting a classification such as Classification: CONFIDENTIAL/FINANCIAL INFO/SR MANAGERS ONLY in the first or last line of the message. HTML formatting can be applied to the message itself or the prefix or postfix text., for instance color, special fonts, font size, or formatting (table etc) can all be applied to text in the message. Additional attachments such as address v-cards or images can be included based upon the classification selected.

High level functions are available to the user when composing or sending a new message through operation of the toolbar. These functions are also available if the user wants to apply classification information to a message received that currently has no classification properties. These functions include: selecting Classification from dropdowns in toolbar; forcing selection of classification on Send or Save from popup dialog; adding text prefix or postfix to the message; adding HTML prefix or postfix to the message; adding Subject line marking prefix or postfix is added to message subject line; and creating classification metadata and x-headers. These high level functions of the toolbar provide for: interpreting classification properties and/or classification metadata and x-headers; viewing Classifications from toolbar; viewing text & HTML formatting in prefix or postfix of message; viewing Subject line marking prefix or postfix in message subject line; and providing a downgrade warning or preventing a Reply/Forward.

Figure 5:
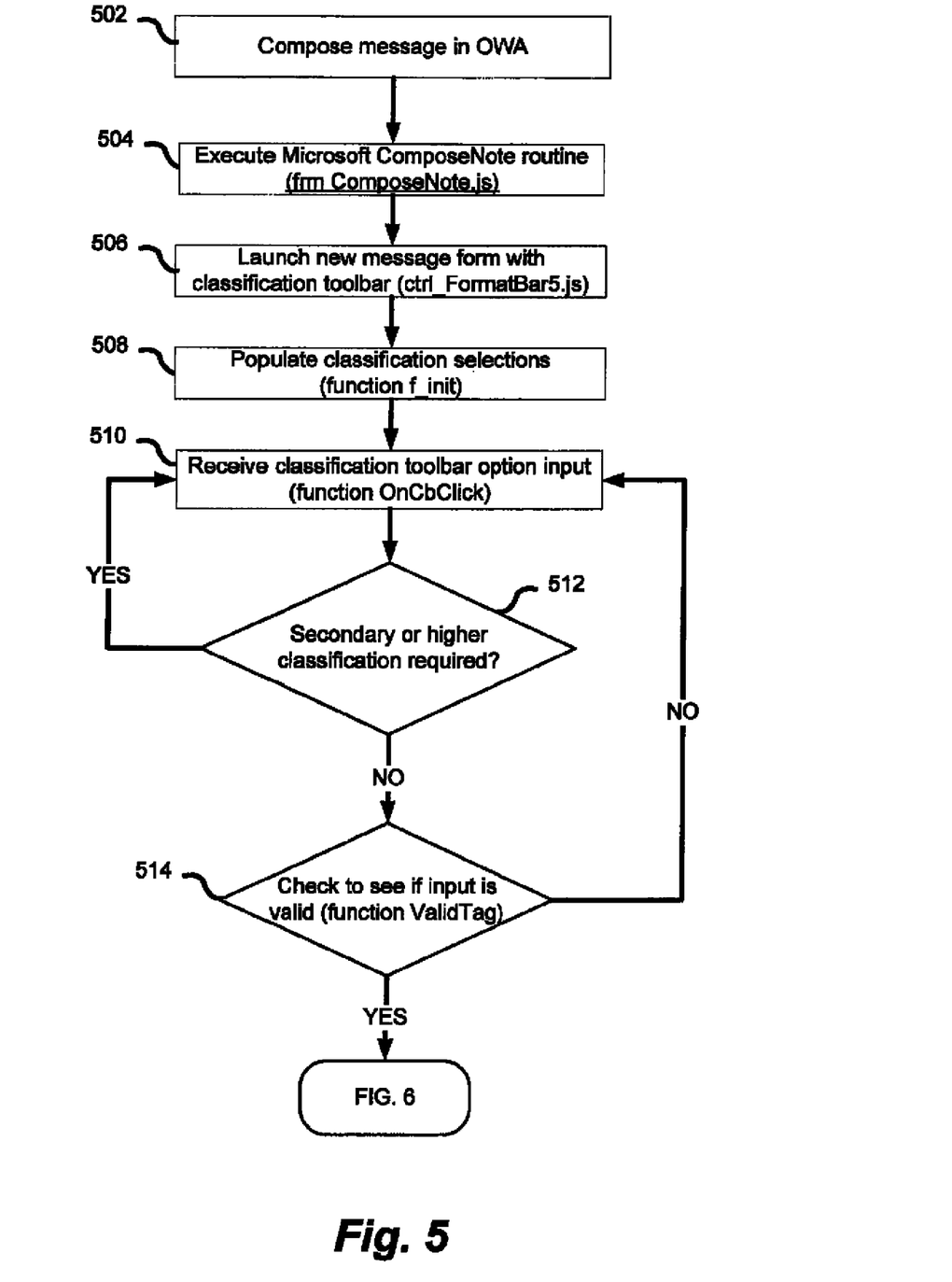
FIGS. 5 & 6 present a method for implementing web e-mail classification.
Figure 6:
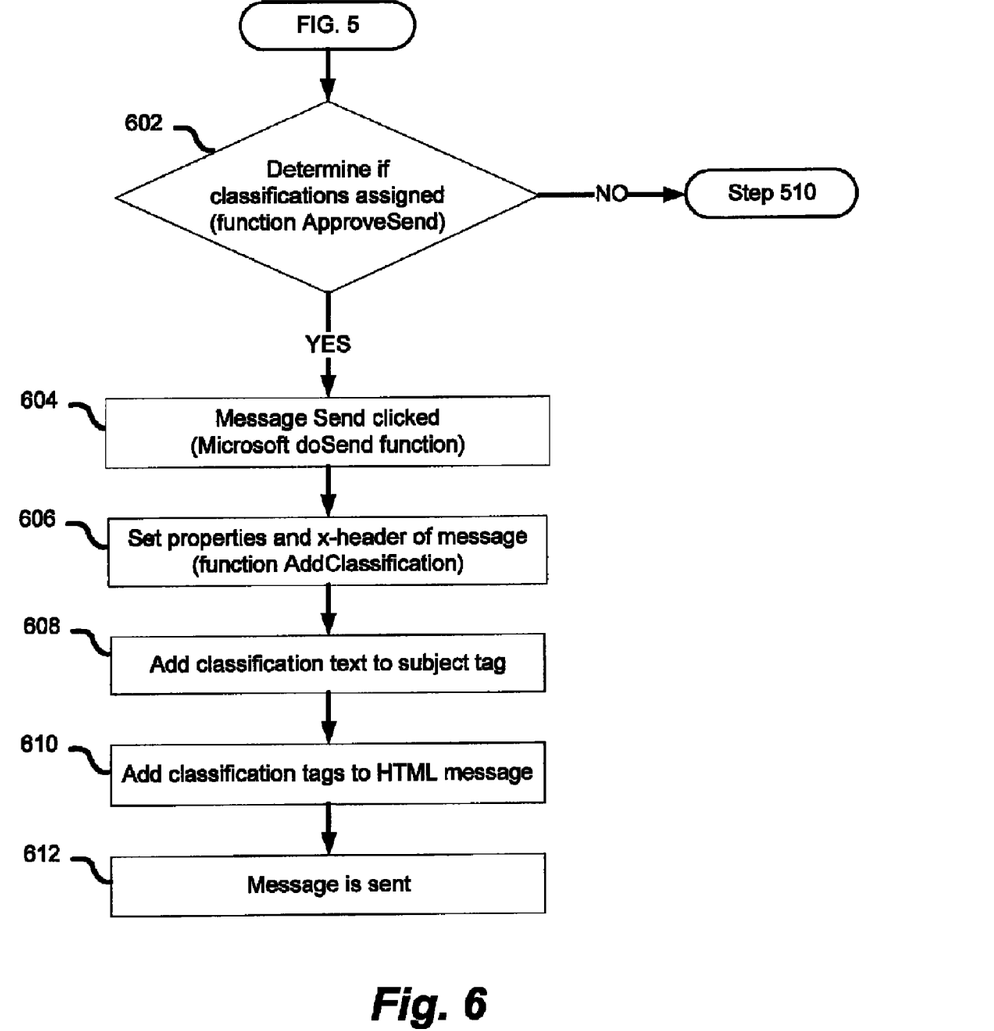

FIGS. 5 and 6 show a method for executing a classification toolbar and generating an message containing classification properties. At step 502 a user selects to compose a message within the OWA client at step 502. The compose function may be a new message or may be part of replying or forwarding an existing message. The Microsoft composeNote.js routine is executed to present a composition window. A new message form is then launched with the classification tool bar utilizing JavaScript (for example ctrl_FormatBar5.js) at step 506. The message form may be spawned within an existing window or within a new window. Based upon the defined administration policy of the classification the toolbar can then be populated with classification selection (for example function f_init). The population criteria may be a default setting or may utilize existing classification settings associated with the message in the case of forwarding or replying. The user can then select a first classification level at step 510 (for example function ON CbClick). If multiple classification level policies are implemented, YES at step 512, the next menu selection can then be made available at step 510. The selection of the next level of classification may be related to the previous level of classification selected, for example each selection in the first level may have a different subset of selections available in the second or subsequent levels. If no more classification levels are required, No at step 512, the input is validated at step 514. Validation may be performed by the server or based upon rules contained within the client. If the input is valid, Yes at 514, as shown in FIG. 6, it is determined if classifications are assigned (for example see function ApproveSend) at step 602. If no classification are assigned, No at step 602, step 510 is re-executed to require user input. If the classifications are assigned, Yes at step 602 the message can then be ready for sending once the user has completed composing the message. At step 604 once a message Send function is selected by the user at step 604, (for example Microsoft doSend function), the x-header properties of the message can then be set (for example function AddClassification) to include the selected classifications. The subject line of the message can also be modified at step 608 to include relevant classification information and any classification tags associated with the selected classifications which can be added to the start or end of the message at step 610. The message can then be sent at step 612 to the identified recipient(s).

The following describes the logic of the software and the associated triggered actions. The system adds functionality to the Microsoft OWA client (Microsoft OWA is referred to here as "existing" files or functions). It does this by modifying the files on the Microsoft Exchange server that sit in the Exchange directory (default location of C:\Program Files\Exchsrvr\exchweb).

Figure 7:
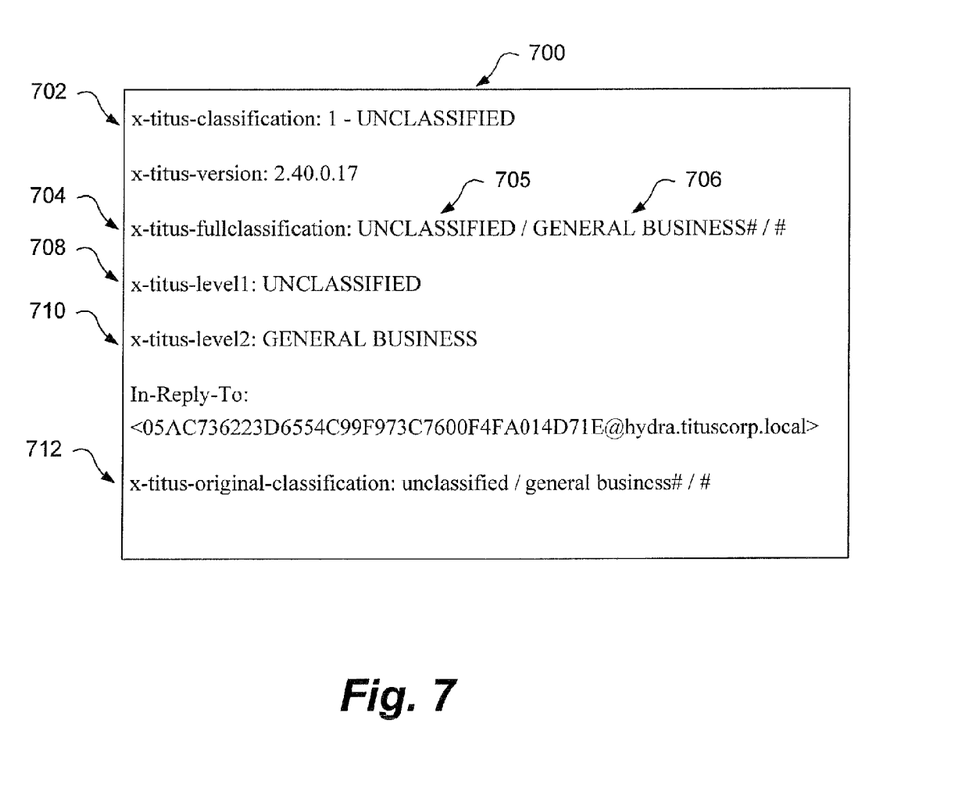
FIG. 7 presents modified x-header implementation.

File ctrl messaqe.js:
    Summary: Existing Javascript file used when a message is being composed
function f SaveClassification( )
    Summary: Saves the classification of the message
    Calls AddClassification
function f SetClassification( )
    Summary: Set all things on the message related to the classification selection like the message subject
    Calls AddClassification
    Calls RemoveSubjectTag
    Creates the new subject
    Calls TagFontHTMLStart
    Calls TagFontHTMLEnd
    Sets the HTML body
function f init( )
    Summary: Initialize the message with the default selections
    Set initial selections for dropdown
    Set initial message properties
    If this is not a new message
    Get the x-header properties from the message
    Set the dropdown selections to the properties we just retrieved
frm ComposeNote.js
    Summary: Existing Javascript file used when a message is being composed
function window.onload( )
    Summary: Existing function that is called when the page is loading
    Add the toolbar to the window
    If this is a reply
    Read the classifications from the cookie
function SaveMessage( )
    Summary: Existing function that is called when the message is being saved
    Calls TransferToMessage
    Calls objMessage.SaveClassification
function onCbClick(sCmd, varValue, fHotkey)
    Summary: Existing function that is called when a button is clicked
    Parameter sCmd: What control sent the event
    Parameter varValue: Value associated with event
    Parameter fHotkey: If a hotkey shortcut was used
    Returns: True if event handled
    Calls TransferToMessage
    Calls ApproveSend
function doSend( )
    Summary: Existing function that is called when the message is being sent
    Calls objMessage.SetClassification
frm ReadNote.js
    Summary: Existing Javascript file that is used when a message is being read
function window.onload( )
    Summary: Existing function that is called when the window is loaded
    Add the toolbar to the window
    Read the MAPI properties from the message
    Set the toolbar to the classifications
function onCbClick(sCmd, varValue, fHotkey)
    Summary: Existing function that is called when a button is clicked
    Parameter sCmd: What control sent the event Parameter varValue: Value associated with event
Parameter fHotkey: If a hotkey shortcut was used
Returns: True if event handled
Write the classification in a cookie
util View.js
Summary: Existing Javascript file used when displaying messages in a folder.
function mf doMessageAction(mode)
Summary: Existing function that is called when an action is required for a message
Parameter mode: Type of message action
Read the MAPI properties from the message
Write the classification in a cookie
banner.htm
Summary: Existing HTML file that shows a banner in the help window
function openWindow2( )
Summary: Launch our product's help information
Launch a new window for AboutMessageClassification.htm
ctrl FormatBar2.htc
Summary: New component file that contains the definition for our message compose toolbar
ctrl FormatBar2.js
Summary: New Javascript file that contains the implementation of our message compose toolbar
function onDocumentReady( )
Summary: Called when the window is finished loading
Insert the toolbar into the message window
Set the dropdown values based on the settings file
function onDisplayChanged( )
Summary: Called when the toolbar has been modified by the user
Stores the dropdown selections in local variables
function f CallOnDisplay( )
Summary: Called when the toolbar has been modified by the user
Calls onDisplayChanged
ctrl FormatbarRead.htc
Summary: New component file that contains the definition for our message read toolbar
ctrl FormatbarRead.js
Summary: New Javascript file that contains the implementation for our message read toolbar
function onDocumentReady( )
Summary: Called when the window is finished loading
Insert the toolbar into the message window
Calls f_update
function f update( )
Summary: Called when the toolbar has been modified by the user
Sets the text of the toolbar to the current classification
functions.js
Summary: New Javascript file that contains global functions for use in other files
function TagFontHTMLStart(tag)
Summary: Helper function to get the HTML associated with a tag
Parameter tag: Tag to get associated HTML
Returns: Associated HTML
function TaGFontHTMLEnd(tag)
Summary: Helper function to get the HTML associated with a tag
Parameter tag: Tag to get associated HTML
Returns: Associated HTML
function PostfixCustom(tag)
Summary: Helper function to get the postfix associated with a tag
Parameter tag: Tag to get associated postfix
Returns: Associated postfix
function Abbreviate(tag)
Summary: Helper function to abbreviate a tag
Parameter tag: Tag to abbreviate
Returns: Abbreviated tag
function GetValue(tag, defaultValue)
Summary: Helper function to get the value of a name/value pair
Parameter tag: Name in name/value pair
Parameter defaultValue: Value to use if name/value pair not found
Returns: Value of name/value pair
Searches an HTTP response for the tag.
If the tag is not found
Return defaultValue
Else
Return the value associated with the tag
function RemoveSubjectTag(allTags, idx, abbreviate)
Summary: Helper function to remove a tag from the subject
Parameter allTags: List of all tags to search for
Parameter idx: Position to start from
Parameter abbreviate: Use the abbreviated version of a tag or not
Returns: The position of a tag found
Searches the subject for the tags in allTags
If abbreviate
Search for the abbreviated tag instead
If the tag is found
Remove it from the subject
Return the position where it was found
function ValidTag(testTag, tagList)
Summary: Helper function to test the validity of a tag
Parameter testTag: Tag to test
Parameter tagList: List of tags
Returns: True if tag is in list
Determines if the testTag is in the tagList
If testTag is in tagList then returns true
Else returns false
function RemoveSpecialChars(str)
Summary: Helper function to remove all special characters from the string
Parameter str: String to remove characters from
Returns: String without special characters
function DetermineSender( )
Summary: Helper function to determine the sender of the message
Returns: The sender address
Determines the sender of a message based on what URL is being used
function decToHex(dec)
Summary: Helper function to convert a number to a Hex string
Parameter dec: The number to convert
Returns: Hex string representation
function hexToDec(hex)
Summary: Helper function to convert a Hex string into a number
Parameter hex: Hex string to convert
Returns: Number represented by hex string
function RFC2045(str, command)
Summary: Helper function to encode/decode using RFC2045
Parameter str: String to encode/decode
Parameter command: Encode or decode Returns: encoded/decoded string
If command is encode
Encode according to RFC2045
If command is decode
Decode according to RFC2045
function RFC2047(str, command)
Summary: Helper function to encode/decode using RFC2047
Parameter str: String to encode/decode
Parameter command: Encode or decode
Returns: encoded/decoded string
If command is encode
Encode according to RFC2047
Calls RFC2047Encoder
If command is decode
Decode according to RFC2047
Calls RFC2047Encoder
function RFC2047Encoder (str, command)
Summary: Helper function to encode/decode using RFC2047
Parameter str: String to encode/decode
Parameter command: Encode or decode
Returns: encoded/decoded string
If command is encode
Encode according to RFC2047
If command is decode
Decode according to RFC2047
function parseClassification (original, number)
Summary: Helper function to get the classification for the level
Parameter original: String containing all classifications
Parameter number: Level of classification to return
Returns: Classification associated with that level
Returns the classification for the level specified by number
function AddClassification( )
Summary: Helper function to set the MAPI properties of the message
Returns: The URL that the message uses
Set the MAPI properties of the message
function readCookie(name)
Summary: Helper function to get the name of a name/value pair from a cookie
Parameter name: Name of name/value pair
Returns: Value of name/value pair
Gets the value of a name\value pair from the cookie
function TransferToMessage( )
Summary: Helper function to transfer the classification to the message
Calls CallOnDisplay
Takes the dropdown selections and gives them to the message
function ApproveSend( )
Summary: Helper function to check if the message is okay to send
Returns: True if message can be sent
If the classifications are not set
Show a message saying the classifications have to be picked before the message can be sent
Don't allow the send
Else
If a downgrade has occurred
Prevent message from sending based on options
settings.js
Summary: New Javascript file that contains a list of variables used to control the behavior of the product
AboutMessageClassification.htm
Summary: New HTML file that contains our products information including the product version
function window.onload( )
Summary: Called when the window is being loaded
Adds the product version to the HTML As shown in FIG. 7 metadata may be associated in customizable x-header 700 properties of the message metadata which can be created that represent the selected classifications. The x-header are added to e-mail or message metadata such as defined by RFC 2822 These x-headers can be created in many different formats including in the Australian Protective Marking Standard format and the MIP format. A general classification line 702 identifies the first level of classification selected. A full classification identification line 704 includes all levels associated with the message, for example a first classification 705 of UNCLASSIFIED and secondary level 706 GENERAL BUSINESS. Additional levels may be identified as required. Each level can then be individual identified at 708 and 710. These entries may provide more details or properties associated with the classification if required. In the case of a forwarding or replying scenario the original classification 712 can also be provided which permits determination of permitting or denying these actions based upon policies implemented on the client or server. The property name in the header can be customized to reflect the organization and are not limited to the ones shown. For instance, the following x-header could be generated for a government organization: x-govt-classification: CONFIDENTIAL/RETAIN FOR 90 DAYS. Standard metadata can also be included in the message in addition to a hash code based upon the classification setting to enable the server or client to determine if the classification is authentic or has been tampered with. The classification information may be stored in e-mail metadata or may alternatively be stored as XML properties in the e-mail instead as Microsoft Outlook MAPI or SMTP headers. Generally classification is applied to the whole e-mail, however it may be applied alternatively applied on the paragraph elements of the e-mail enabling only portions of the content to be associated with a classification level and appropriate action to be taken only in terms of the identified text. It should be understood that the structure of the metadata may be configured by any number of ways and is not limited to the implementation described.

Although Microsoft OWA has been discussed, alternate corporate web mail clients such as Lotus Notes Web Mail may be utilized. In addition web e-mail classification may be utilized to create other e-mail properties such as associate project, case number, file number, patient number, customer number, program name or number, or other similar properties as required. The selection of classification properties from other user interface elements (in addition to described toolbar) such as popup dialog, or additional windows or headers that would accept input above the e-mail may be provided.

By adding a classification toolbar to a web client and imposing classification identification at the client interface user recognizable classification properties and visual markings can be added Microsoft Outlook Web Access e-mail and calendar items when they are sent or when they are received to ensure a level of security and confidence to e-mail communications not previously provided. In addition classification, distribution, and retention of valuable or sensitive corporate e-mail is enabled.

It will be apparent to persons skilled in the art that many alternatives, modifications, and variations can be made without departing from the scope as defined in the claims. The method steps described may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

A computing environment for executing the web client and the disclosed classification toolbar may be implemented as computer software in the form of computer readable code executed. The computing environment may be any number of computing or computer based platforms such as mobile devices, personal computer, notebook computers, or personal digital assistants. The computer comprises central processing unit (CPU) and memory. The CPU may be a single processor or multiprocessor system. In various computing environments, main memory and storage can reside wholly on computer environment, or they may be distributed between multiple computers.

Input devices such as a keyboard and mouse may be coupled to a bi-directional system bus of a computer for receiving input for creating messages within the web client. The keyboard and mouse are for introducing user input to a computer and communicating that user input to processor if required. Computer may also include a communication interface. Communication interface provides a two-way data communication coupling via a network link to a network by wired or wireless connection or may provide an interface to other host devices by a direct radio frequency connection. In any such implementation, communication interface sends and receives electrical, electromagnetic or optical signals which carry digital data streams representing various types of information. Communication between the communication interface unit and the network or host use electrical, electromagnetic or optical signals which carry digital data streams. The signals through the various networks and the signals on network link and through communication interface, which carry the digital data to and from computer, are exemplary forms of carrier waves transporting the information.

The computer processor or similar device may be programmed in the manner of method steps, or may be executed by an electronic system which is provided with means for executing these steps. The storage device may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

The embodiments described above are intended to be illustrative only. The scope of the invention is therefore intended to be limited solely by the scope of the appended claims.

The invention claimed is:

1. A method for message security classification in a web e-mail access client comprising:
opening a message form within a web client window of the web e-mail access client; receiving a user-generated event from the group consisting of send events, print events and save events;
in response to said user-generated event, presenting the user with a popup dialog requiring the user to select a first security classification based upon predefined classification criteria available to the user for associating with the message form of the web e-mail access client; receiving a first security classification selection input from the user;
assigning header properties to the message metadata associated properties based upon the security classification selection;
determining whether a secondary classification is required based upon the first security classification input;
receiving a secondary classification selection input from the secondary classification options selected by the user from the popup dialog;
determining whether the security classification selection input and the secondary classification selection input are valid; and
assigning x-header properties to the message metadata x-header properties are based upon the security classification selection input and secondary classification selection input when security classification selection input and secondary classification selection input are valid;
wherein the security classification selection input associated with a portion of identified text within a text body of the message form and the x-header properties are assigned by association with the identified text in the text body of the message form.

2. The method of claim 1 wherein the header properties are simple mail transfer protocol (SMTP) x-header properties.

3. The method of claim 2 wherein the message form is based upon a previously created or received message form, the security classification selection is compared to previous security classification selection and if the first security classification selection is lower than the previous security classification selection associated with the message form, the first selected security classification is denied or a warning is displayed to the user that the security classification of the message form has been lowered.

4. The method of claim 2 further comprising adding visual markings to the message form selected from one or more security classification characteristics within the group comprising: inserting a classification identifier into a subject line of the message; inserting a classification identifier into a body of the message text; inserting a watermark in the body of the message form; and inserting security classification identification text at the start or end of the message form.

5. The method of claim 2 wherein the pre-defined classification criteria are defined relative to one or more security levels and one or more selected from the group comprising: sensitivity levels, intended distribution groups and retention level.

6. The method of claim 2 wherein the message form is based upon a previously created or received message and wherein the security classification selection input and the secondary selection input are compared to previous classification selections and wherein the classification selections populated in the popup dialog are limited to selections that are equal to or higher level than the previous classifications selections.

7. The method of claim 2 further comprising adding recognizable classification properties and visual markings to the message form by inserting a security classification identifier into a subject line of the message based upon the security classification selection input.

8. The method of claim 2 further comprising adding recognizable classification properties and visual markings to the message form by inserting a security classification identifier into a body of the message form based upon the security classification selection input.

9. The method of claim 2 wherein the security classification identifier comprises prefix or postfix text added to the message body based upon the security classification selection input.

10. A non-transitory computable readable medium comprising instructions for message security classification in a web e-mail access client which when executed a processor perform:
  opening a message form within a web client window of the web e-mail access client;
  receiving a user-generated event from the group consisting of send events, print events and save events;
  in response to said user-generated event, presenting the user with a popup dialog requiring the user to select a first security classification based upon predefined classification criteria available to the user for associating with the message form of the web e-mail access client;
  receiving a first security classification selection input from the user;
  assigning header properties to the message metadata associated properties based upon the security classification selection;
  determining whether a secondary classification is required based upon the first security classification input;
  receiving a secondary classification selection input from the secondary classification options selected by the user from the popup dialog;
  determining whether the security classification selection input and the secondary classification selection input are valid; and
  assigning x-header properties to the message metadata x-header properties are based upon the security classification selection input and secondary classification selection input when security classification selection input and secondary classification selection input are valid;
  wherein the security classification selection input associated with a portion of identified text within a text body of the message form and the x-header properties are assigned by association with the identified text in the text body of the message form.

11. The non-transitory computable readable medium of claim 10 wherein the header properties are simple mail transfer protocol (SMTP) x-header properties.

12. The non-transitory computable readable medium of claim 11 wherein the message form is based upon a previously created or received message form, the security classification selection is compared to previous security classification selection and if the first security classification selection is lower than the previous security classification selection associated with the message form, the first selected security classification is denied or a warning is displayed to the user that the security classification of the message form has been lowered.

13. The non-transitory computable readable medium of claim 11 further comprising adding visual markings to the message form selected from one or more security classification characteristics within the group comprising: inserting a classification identifier into a subject line of the message; inserting a classification identifier into a body of the message text; inserting a watermark in the body of the message form; and inserting security classification identification text at the start or end of the message form.

14. The non-transitory computer readable medium of claim 11 wherein the pre-defined classification criteria are defined relative to one or more security levels and one or more selected from the group comprising: sensitivity levels, intended distribution groups and retention level.

15. The non-transitory computer readable medium of claim 11 wherein the message form is based upon a previously created or received message and wherein the security classification selection input and the secondary selection input are compared to previous classification selections and wherein the classification selections populated in the popup dialog are limited to selections that are equal to or higher level than the previous classifications selections.

16. The non-transitory computer readable medium of claim 11 further comprising adding recognizable classification properties and visual markings to the message form by inserting a security classification identifier into a subject line of the message based upon the security classification selection input.

17. The non-transitory computer readable medium of claim 11 further comprising adding recognizable classification properties and visual makings to the message form by inserting a security classification identifier into a body of the message form based upon the security classification selection input.

18. The non-transitory computer readable medium of claim 11 wherein the security classification identifier comprises prefix or postfix text added to the message body based upon the security classification selection input.

* * * * *